United States Patent [19]
Krebs

[11] Patent Number: 5,178,434
[45] Date of Patent: Jan. 12, 1993

[54] REAR FLOOR FOR MOTOR VEHICLE

[75] Inventor: Bernd Krebs, Wettstetten, Fed. Rep. of Germany

[73] Assignee: Audi, AG, Ingolstadt, Fed. Rep. of Germany

[21] Appl. No.: 843,955

[22] Filed: Feb. 28, 1992

[30] Foreign Application Priority Data

Mar. 1, 1991 [DE] Fed. Rep. of Germany ....... 4106506

[51] Int. Cl.$^5$ ............................................. B62D 25/00
[52] U.S. Cl. ................................ 296/37.3; 296/97.23; 180/271
[58] Field of Search .................. 296/97.23, 39.1, 39.3, 296/204; 180/271, 309

[56] References Cited

U.S. PATENT DOCUMENTS

| | | | |
|---|---|---|---|
| 4,175,631 | 11/1979 | Ishii et al. ............................ | 180/309 |
| 4,801,169 | 1/1989 | Queen et al. ........................ | 296/39.1 |
| 4,898,419 | 2/1990 | Kenmochi et al. ................. | 296/204 |
| 5,011,210 | 4/1991 | Inoue ............................ | 296/97.23 X |

FOREIGN PATENT DOCUMENTS

| | | |
|---|---|---|
| 0333267 | 9/1989 | European Pat. Off. . |
| 3247979 | 7/1984 | Fed. Rep. of Germany . |
| 3430826 | 3/1986 | Fed. Rep. of Germany . |

*Primary Examiner*—Robert R. Song
*Attorney, Agent, or Firm*—Jacques M. Dulin; Thomas C. Feix

[57] ABSTRACT

An improved floor configuration for the interior rear portion of a motor vehicle wherein at least one region, made of a fracture-prone material such as plastic and typically the spare tire cavity or foot recess cavity region, is covered by a sealing cover assembly having properties of high ultimate elongation, fluid impermeability (both liquid and gas impermeable), and good crack or tear-resistance. In one embodiment, the sealing member comprises a carpet having a flexible, stretchable backing layer, preferably a plastic sheet having high ultimate elongation, high yield strength and good resistance to hydrocarbons. In the event of a collision-induced fracture or crack in the floor, the sealing cover assembly prevents any direct air communication between the outside ambient atmosphere and the interior passenger space of the vehicle so that flammable gases or noxious fuel vapors originating from a nearby damaged fuel tank or from the deformed engine compartment of a colliding vehicle cannot enter the interior passenger space of the vehicle. The elasticity and stretch features of the carpet with seal layer ensure that any sharp fracture edges resulting from floor deformation remain unexposed so that the passengers are protected against injury. In another embodiment the high ultimate elongation properties of the carpet seal combination are enhanced by stretchable folds provided in those regions adjacent the footwell side walls of the plastic cavity shell.

20 Claims, 1 Drawing Sheet

U.S. Patent Jan. 12, 1993 5,178,434
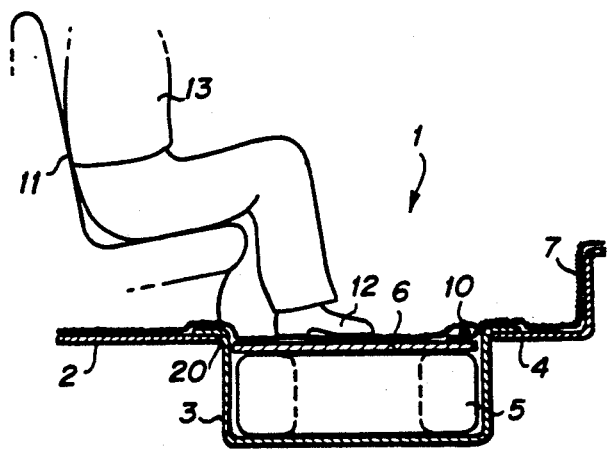
Fig_1
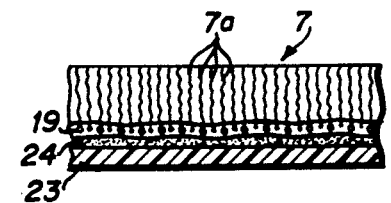
Fig_4
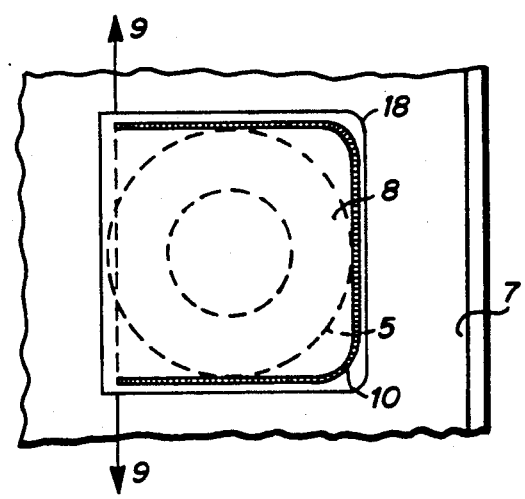
Fig_2
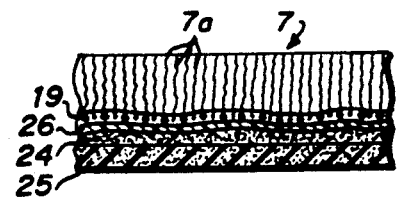
Fig_5
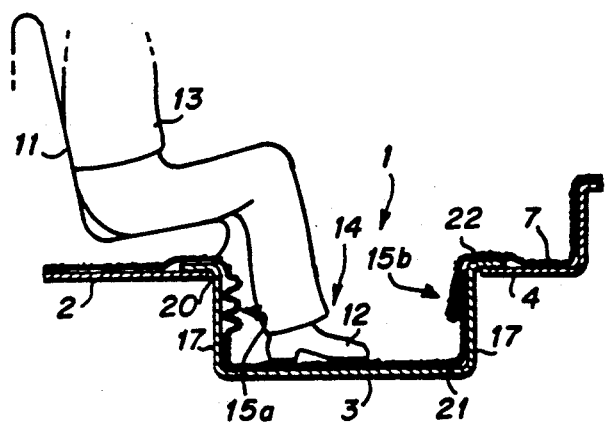
Fig_3

REAR FLOOR FOR MOTOR VEHICLE

FIELD

This generally to safety systems for plastic floors for motor vehicles. More particularly, this invention relates to a safer construction of the interior rear floor region of a motor vehicle, whereby the fracture-prone floor region is made safer by inclusion of a highly flexible, stretchable, gas-tight, and crack-resistant cover having properties such as elongation-intensive properties, including high ultimate elongation. The cover prevents flammable or harmful liquids or gases from entering the interior passenger space of the motor vehicle in the event that the plastic flooring ruptures or cracks during a collision.

BACKGROUND

In the field of motor vehicle body construction, the interior floor regions of the motor vehicle chassis are typically made from deep-drawn metal floor sheets which are welded together. In the event of a collision-type accident, portions of the colliding vehicle body become deformed, which, in turn, may cause deformation of the welded interior floor sheets. Since the floor sheets are typically sheet metal, there is a high likelihood that, in view of sheet metal's limited pliability, cracks or fractures will develop in the floor region during the collision-induced deformation. This deformation often produces a continuous opening or large fissure in the interior floor which is viewable from the outside. Any opening in the floor is undesirable, since it permits noxious fumes and/or flammable gas or fuel vapors to enter the interior passenger space. This is a particularly serious problem when the fuel tank is located underneath or adjacent to a floor section which is subject to deformation during impact or collision, since in this instance, the fuel tank is also subject to rupture.

In an effort to decrease weight and improve fuel efficiency, modern car bodies are making increasing use of floor sections made of plastics. The use of plastics is desirable since they are readily formable into a variety of surface configurations. In one known configuration (European Patent Application 0 333 267), the floor section of the motor vehicle in the region adjacent the rear trunk and rear seat consists of two substantially horizontal plastic parts which are rigidly interconnected in a box-shaped structure to form a compartment therebetween. This compartment may be utilized for accommodating a spare tire.

In another known configuration for a station wagon, the flooring section in the rear storage region consists of a plastic sheet having a molded recess for a spare tire, along side of which is a second recess for accommodating the fuel tank. It is also a familiar technique to provide a rearwardly disposed reserve seat in a station wagon, wherein the reserve seat faces opposite to the direction of travel. In order to accommodate the feet of a passenger seated on such a rear seat, the rear floor section may be fabricated from a plastic floor sheet having a formed cavity, or step-down recess for the feet. In the alternative, these cavities may also be used to accommodate a spare tire.

In these known examples, the conventional plastics used have little pliancy and are prone to fracture, so that in the event of a major collision, there is still a great danger that deformation of the floor sheet will result in cracking or fracture that would produce an opening in the plastic floor sheet, which, in turn, would expose the interior passenger space to the ambient outside atmosphere. This may result in permitting noxious fumes or flammable gases into the vehicle through the broken and/or torn pieces of plastic, especially if the fuel tank is located under the vehicle chassis in the rear, as is the usual case. Thus, the danger of a fire inside the vehicle is very high for this type of motor vehicle body construction.

German Patent Document DE-OS 32 47 979 discloses a spare tire cavity floor configuration constructed of sheet metal and teaches a method for protecting a fuel tank disposed under the spare tire cavity in the event of a rear end collision. In this design, the front end of the spare tire cavity, as well as a portion of the spare tire, is bridged by an arresting plate, the purpose of which is to transfer lateral force and prop up major deformation of the floor sheet through the rim of the spare tire against a cross-member, such that the fuel tank located beneath the tire cavity is protected against damage resulting from cavity flooring deformation. However, such design does not reduce the danger of fracture to the floor when the spare tire is missing or when a plastic floor and formed cavity is used for holding a spare tire.

In another known example of a motor vehicle interior rear floor construction having a spare tire cavity (German Patent Document DE 34 30 826), the spare tire cavity is made with a variable depth, so that it may accommodate either a narrow width or normal width spare tire. The spare tire cavity is provided with mechanical means for lowering the floor section of the cavity for this purpose. Concertina (accordion-type) walls are provided to the spare tire cavity in order to produce a tight fit connection between the solid floor portion of the spare tire cavity and the surrounding floor section of the trunk. When plastic is used in connection with such a design, there is a great danger of fracture and cracking in and around the cavity region from a rear end collision, and thus flammable gases may still enter into the vehicle.

Even when the fuel tank is not located underneath the rear floor region of a station wagon, a fire danger to the occupants of the station wagon is still present during a rear end collision by another vehicle. In such an event, the front end of the colliding vehicle containing the engine compartment is often deformed and possibly contains fuel, and, as a result of the collision, it is in the immediate vicinity of the rear passenger region of the station wagon. Fuel leaking from the damaged engine compartment of the colliding vehicle may find its way into the station wagon passenger compartment through cracks in the station wagon rear floor regions.

The danger of fire or asphyxiation is still present, even in the situation where these plastic parts are covered with a conventional floor carpeting, since such carpeting is usually only loosely placed within the cavities and not applied in an air-tight manner. Also the fixation of the carpeting to the plastic flooring is such that any moderate degree of stretching induced by a collision will cause the carpet to rip or tear at breakage sites determined by the plastic floor deformation.

Accordingly, there is a clear and urgent need in the art for the design of an improved interior rear floor portion of a motor vehicle of the fracture-prone material type, which includes means for preventing entry of flammable gases and noxious fumes into the interior passenger space of the motor vehicle in the event the plastic floor member becomes deformed from a collision.

THE INVENTION

OBJECTS

It is a principal object of the present invention to provide an improved floor construction for the interior rear floor region of a motor vehicle which employs plastic fracture-prone type floor sheet material, and/or which includes a molded cavity portion for accommodating a spare tire or a passenger's feet, wherein the improved floor construction includes a safety cover member for preventing gas or vapor from entering into the interior passenger space of the motor vehicle in the event that ruptures or fissures occur in the plastic floor material caused by deformation as a result from a collision type accident.

It is another object of the invention to provide the safety cover member in the form of improved floor carpeting which is provided with a plastic or other type backing layer or sheet, which backing has high ultimate elongation for improved sealing properties so that it is impermeable to gas and liquid and is resistant to cracking, ripping or tearing.

It is another object of the invention to provide safety cover carpeting material with stretch folds in the regions of the carpeting material disposed adjacent the cavity side walls of the plastic floor sheet to further enhance the high ultimate elongation properties of the cover carpeting in order to resist puncture, tearing or perforation in those portions of the cover adjacent the cavity region.

Still further objects will be evident from the specification, drawings, and claims.

DRAWINGS

FIG. 1 is a length-wise section view taken along a longitudinal fore-aft axis of a vehicle showing a principle embodiment of the floor configuration of the present invention for implementation in the rear storage region of a station wagon having a spare tire cavity and a reserve extra seat arranged opposite to the direction of travel.

FIG. 2 is a top plan view of the region of the spare tire cavity of FIG. 1.

FIG. 3 is a length-wise section view taken along the longitudinal axis of a motor vehicle showing an alternate embodiment of the invention for implementation in the rear storage area of a station wagon having showing a cavity in the form of a foot recess and a reserve seat arranged opposite to the direction of travel.

FIG. 4 is an enlarged cross section view of the seal cover member.

FIG. 5 is an enlarged cross section view of an alternate embodiment for the seal cover member.

SUMMARY

The invention is directed to an improved interior floor configuration for a motor vehicle in which at least a portion of floor region fabricated from a fracture-prone material, typically plastic, wherein the floor is covered by an elongation-intensive seal or cover member which is impermeable to gas (liquid and vapor) and is resistant to cracking, tearing or ripping. By the term "elongation-intensive", it is meant a plastic or later sheeting or coating that has high ultimate elongation (measured in stretched length compared to unstretched length as a percentage), preferably a high yield strength, and good resistance to hydrocarbons (gasoline and diesel fuel). Suitable plastic sheetings are: polyolefins such as polypropylene, polyethylene, polypropylene copolymers; PVC; modified PVC; mylar, nylon, and co- and ter- polymers. Latex coatings or impregnations into the carpet backing, or safety-type closed cell foam sheets glued or bonded to the carpet back may also be used. The seal cover is secured to the sides of the vehicle in the usual way, for example, by clamping strips, and is thus connected to the body of the vehicle with considerable gas tightness. Alternately, the seal cover may be bonded to the floor and sides by glue, or a self-foaming safety foam.

When a fracture or a crack is formed in the fracture-prone floor material as a result of a collision with consequent stressing and deformation of the vehicle floor, a lengthening of certain portions of the elongation-intensive safety covering of this invention will occur, but it will not crack, rip or tear. Thus, a rupture or crack in the plastic floor structure of the vehicle does not extend through to the interior passenger space, preventing flammable gases which are produced by crash damage to the gas tank from entering the interior of the vehicle. Furthermore, no sharp fracture edges are exposed to passengers in the vehicle, as these are covered up and blunted by the elastic covering and/or rug. Since the gas released in a crash is not accompanied by pressure build up, total gas tightness or complete air sealing by the cover is not required. Thus, a sufficient seal is provided if gas flow does not occur across the entire width of the crack.

The covering of sharp fracture edges and prevention of penetration of flammable gases into the passenger space makes the vehicle altogether more safe for the passengers.

In a specific embodiment of the invention, a trough-like formed plastic shell is installed in a cutout area of the floor sheets.

This trough-like shell functions as a spare tire cavity and is covered by a plate disposed to rest on top of the spare tire at approximately roughly the height of the rest of the floor. In one embodiment of the safety cover invention of this case, the cover is provided with a cutout in the area of the spare tire cavity, preferably in the form of a hinged flap. This flap opening can be releasibly closeable by means of a connection with good force transmission, preferably by a zipper. In this way, a satisfactory covering seal as proposed by the invention is also achieved. In similar fashion, a hinged cover can also be used for other compartments made of plastic, for example, those to accommodate an emergency reflective triangle, a jack, tow rope, bungee cords, flares etc.

In another specific embodiment of the invention, the safety cover is particularly advantageous for use in combination with familiar plastic shells formed as part of the floor section in the rear of a vehicle, such as a station wagon, as a result of which the fire risks associated with rear end collisions are reduced. The rear floor section may incorporate molded trough-like plastic shells which are used in the familiar manner to serve as a spare tire cavity for holding a spare tire as described above, and/or as a foot recess for accommodating the feet of the passengers sitting on a spare seat oriented opposite to the direction of travel. In the case of the plastic shell having a foot recess, the special risks associated with rear end collision are overcome by use of the safety covering. While the necessary high ultimate elongation of the cover can be provided by the plastic-backed carpet material itself, in an alternative embodiment, stretch folds are provided to the covering. The stretch folds in the cover provide sufficient elasticity to bridge large fractures and cracks which might occur in the plastic floor. The stretch folds are preferably arranged in the regions of the cover adjacent side walls of the floor cavity.

It is also advantageous to provide the cover in the form of a floor carpeting with the safety barrier. In this way, a natural, pleasing appearance of the vehicle interior is achieved along with the gas tight and puncture-/tear resistant properties of the safety cover of this invention.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what I presently believe is the best mode of carrying out the invention.

FIG. 1 shows a lengthwise section view of the rear storage space 1 of a motor vehicle. In this example, the rear storage area 1 is part of rear interior passenger space of a station wagon. A plastic trough-like shell 3 is installed as spare tire cavity in a cutout (opening 20) in the floor sheet 2, and is secured tightly thereto, preferably by gluing, at the peripheral regions 4 of the floor sheet opening 20. The floor sheet 2 may be fabricated from metal sheet or from one or more known varieties of fiber-reinforced plastics. Preferred plastics for both the floor sheet 2 and shell 3 include, but are not limited to, thermosetting resin systems, such as unsaturated polyester resin or polyurethane resin, and thermoplastics such as polypropylene or polyvinyl chloride, ABS resine, and fiber-reinforced Nylon or Nylon co-polymers. Additionally, glass fibers, carbon or aramide fibers may be used for reinforcement of the plastic.

Within the cavity 3 there is located a spare tire 5 which is covered by a plate 6. A carpet assembly 7, which is designed as an elongation-intensive, gas-tight, and crack-resistant covering, is provided as a top seal covering for floor sheet 2 and plate 6.

As is best seen in the top plan view of the spare tire cavity 3 of FIG. 2, the carpet 7 is provided with a cutout in the form of a flap 8, which can be swung upwardly open about an axis 9—9 which is connected firmly to or integral with the rest of the carpet 7. The flap 8 is sufficiently large to permit the spare tire 5 to be easily inserted within or removed from the cavity 3 when the flap 8 is in the open position.

In order to maintain a fixed and gas-tight connection between the flap 8 and the rest of the carpet 7, a zipper 10 is provided around the edge of the flap, such that the carpet cutout can be firmly reclosed. Since zippers by themselves are fairly leaky, that is, liquid or gas vapor can seep through the teeth and cloth in which the zipper is set, it is preferable to locate the zipper inward of the flap perimeter edge 18 a sufficient distance to provide an overhang flap portion for proper gas tight sealing between flap 8 and the rest of the covering 7 (see FIG. 1).

In the embodiment shown in FIG. 1, an extra seat 11 is arranged in the rear storage area 1 of the station wagon, oriented opposite to the direction of travel. The feet 12 of a passenger 13 are permitted to rest on the plate 6 above the spare tire cavity 3.

FIG. 3 illustrates another embodiment of the invention, wherein a spare seat 11 is also arranged in the rear storage area 1 of a station wagon, but it is arranged closer with respect to the floor of the vehicle or floor sheet 2. The feet 12 of the passenger 13, in this case, are placeable within a foot recess 14. This foot recess 14, like the spare tire cavity 3 in the embodiment of the invention according to FIGS. 1 and 2, is made of a molded plastic shell 17, and is installed in a cutout 20 of the floor sheet 2. The foot recess or shell 14 is preferably firmly secured to the peripheral regions 4 of the floor sheet 2 in the manner as described above. The carpet 7 in this embodiment is drawn into the foot recess 14, and stretch folds 15a and 15b are arranged in the upstanding side wall regions 17 of the foot recess 14. Fold 15a is arranged in accordion fashion and Fold 15b is arranged as a flap, the bottom of which can reach as far down as the floor of the cavity molding 3. Alternatively, the carpet in the region of the foot recess can be installed as a separate piece with a zipper connection as described above in connection with the embodiment shown in FIGS. 1-2 around the periphery. The location may be at position 21 or 22 or in between.

As is best seen in FIG. 4, the interior seal cover of this invention is preferably the combination of an interior carpet layer 7 with a high ultimate elongation sealing member 23, such as a plastic sheet associated therewith. The plastic sheet has high ultimate elongation (measured in stretched length compared to unstretched length as a percentage). The plastic sheet also has a high yield strength and good resistance to hydrocarbons (gasoline and diesel fuel). Preferred plastic sheetings include polyolefins such as polypropylene, polyethylene, polypropylene copolymers, PVC, modified PVC, Mylar, Nylon, and co- and ter- polymers.

In the best mode of the seal cover assembly, a carpet layer (represented by carpet piles 7a) having a fiber or polyolefin backing 19, preferably the latter, is provided, and a high elongation sheet of plastic 23 bonded thereto by a bonding agent 24 such as glue or by use of heat bonding, the latter particularly suitable for polyolefin backing. Alternately, as is seen in FIG. 5, the carpet 7 can be coated with a thick layer of elastomeric material 26, such as a highly stretchable latex.

Alternately or additionally, a layer of closed cell synthetic foam material 25, preferably containing a fire retardant may also be substituted in place of the sealing sheet 23, or as an additional layer between or below the sealing sheet 23 of FIG. 4 and the carpet back 19. Alternately, the foam 25 may be bonded as at 24 to the bottom, floor facing side of the carpet (with or without the coating 26). A plastic sheet between the foam and carpet back, may also be used, in which case the latex coating 26 is not required. The foam 25 provides sound deadening shock absorption, and cushioning of shards of broken flooring.

In still another embodiment, the floor 2 and cavity 3 of the vehicle can be sprayed with glue or a self-foaming material, and the carpet 7 or carpet assembly including a barrier sheet 23 or 25 placed thereon to secure the carpet in place. It should be understood in FIGS. 4 and 5 that the sheet or foam 25 need not be bonded to the rug back 19, but it is preferable to do so.

The above described embodiments of the invention have the following function: In the preferred best mode, the spare tire cavity 3 and the foot recess 14 are fabricated from plastic material in accordance with known plastic forming techniques. However, as described above, plastic floor sheet material for this use is prone to fracture under substantial load. However, where the elongation-intensive, gas-tight, and crack-resistant seal cover assembly of this invention is provided in a suitably formed carpet 7 and flap 8, no direct connection between the inside passenger space and the outside ambient atmosphere occurs, even if large fissures in the plastic floor arise as a result of a collision. Therefore, outside gases, especially flammable fuel vapors from a nearby, damaged fuel tank, cannot find their way into the interior space of the vehicle. The addition of stretch folds 15 permit the carpet 7 to bridge large breakage sites and cracks which may develop in the bend or corner regions of the floor sheet 2 or plastic shell (spare tire cavity 3 or foot recess 17). Furthermore, any sharp fracture edges which form in the plastic cavity 3 are covered and blunted by the carpet 7 and/or flap 8, thus substantially reducing any injury risk that they may pose to the passenger(s).

It should be understood that various modifications within the scope of this invention can be made by one of ordinary skill in the art without departing from the spirit thereof. I therefore wish my invention to be defined by the scope of the appended claims in view of the specification as broadly as the prior art will permit.

PARTS LIST

1. Rear Storage Area
3. Spare Tire Cavity
4. Peripheral Regions
5. Spare Tire
6. Plate
7. Carpet
8. Flap
9. Axis
10. Zipper
12. Passenger's Feet
13. Passenger
14. Foot Recess
15a,b. Stretch Folds
17. Upstanding Side Wall Regions
18. Flap Perimeter Edge
19. Carpet backing
20. Opening
21. Fastening position
22. Fastening position
23. High ultimate elongation sealing member
24. Bonding Agent
25. Foam
26. Elastomeric material

I claim:

1. An improved floor assembly for use in the interior floor regions of a motor vehicle which are subject to collision-induced rupture or fracture, the floor assembly comprising in operative combination:
    a) a base floor member having a vehicle interior facing side;
    b) a safety cover member disposed over said base floor member interior side;
    c) means for fastening said safety cover member to overly said base floor member interior side; and
    d) said safety cover member including a material having properties of high ultimate elongation for resistance to cracking, ripping or tearing and impermeability to gas and liquid to provide a seal against intrusion of gas or liquid upon collision-induced rupture or fracture in said base floor member.

2. An improved motor vehicle interior floor assembly as in claim 1 wherein:
    a) said base floor member is a trough-shaped plastic shell; and
    b) said plastic shell is disposed adjacent the rear storage area of said motor vehicle.

3. An improved motor vehicle interior floor assembly as in claim 2 wherein:
    a) said plastic shell is sized as a cavity to receive a spare tire;
    b) said floor assembly further includes a cover plate disposed to overly said spare tire cavity;
    c) said cover member includes a cutout flap portion disposed coordinate with said spare tire cavity to permit access thereinto;
    d) said cover member includes means for sealable closure, and opening of said cutout flap portion to provide access to said cover plate and to said spare tire cavity; and
    e) said sealable closure being disposed to provide substantially gas and liquid impermeability in the area of said cutout flap.

4. An improved motor vehicle interior floor assembly as in claim 3 wherein said sealable closure and opening means includes:
    a) a zipper for joining the free perimeter edges of said cutout flap portion to a corresponding boundary edge of said cover member; and
    b) said zipper being disposed in association with said cutout flap portion and said cover member boundary edge to provide additional cover member material to cover said zipper when said zipper is in the closed configuration.

5. An improved motor vehicle interior floor assembly as in claim 4 wherein:
    a) the interior floor carpet provided to said motor vehicle forms part of said safety cover member.

6. An improved motor vehicle interior floor assembly as in claim 2 wherein:
    a) said plastic shell is a foot recess sized and disposed to accommodate a passenger's feet.

7. An improved motor vehicle interior floor assembly as in claim 6 wherein:
    a) said sealing cover member is provided with stretchable folded portions disposed adjacent side wall regions of said foot recess; and
    b) said folded portions provide additional material for elongation to better resist tearing, cracking or rupture of said cover member in the area adjacent said foot recess.

8. An improved motor vehicle interior floor assembly as in claim 7 wherein:
    a) the interior floor carpet provided to said motor vehicle forms part of said safety cover member.

9. An improved, pre-formed cover member for use as the interior facing layer of an interior floor assembly of a motor vehicle for automobile floor regions subject to collision-induced rupture or fracture, said cover member comprising in operative combination:
    a) a first layer of sealing material including a high ultimate elongation material for overlaying said interior floor region;

b) said first layer is substantially impermeable to gas and liquid and resistant to cracking, ripping or tearing so that a collision-induced rupture or fracture in bottom layers of an interior floor assembly is sealed off from said interior passenger space of said motor vehicle; and c) said cover member including said first sealing layer is pre-formed to conform to the interior contours of said vehicle floor area to which it is to be attached.

10. An improved, performed interior floor cover member as in claim 9 wherein:
a) said safety cover overlies an interior floor portion disposed adjacent the rear storage area of said motor vehicle and said rear storage area includes a spare tire cavity;
b) said cover includes a cutout flap portion disposed coordinate with said spare tire cavity to permit access thereinto; and
c) said cover includes means for sealable closure and opening of said cutout flap portion to said cover member.

11. An improved performed interior floor cover member as in claim 10 wherein said sealable closure and opening means includes:
a) a zipper for joining the free perimeter edges of said cutout flap portion to a corresponding boundary edge of said cover member; and
b) said zipper being disposed in association with said cutout flap portion and said cover member boundary edge to provide additional cover member material to cover said zipper when said zipper is in the closed configuration.

12. An improved performed interior floor cover member as in claim 11 wherein said safety cover member includes:
a) a second layer of carpet-like material disposed to overlay said first sealing layer; and
b) said first sealing layer and said second layer of woven material together forming the interior floor carpet provided to said motor vehicle.

13. An improved performed interior floor cover member as in claim 9 wherein:
a) said safety cover conformingly overlays the interior floor portion disposed adjacent the rear storage area of said motor vehicle; and
b) said floor portion is provided with a stepped trough portion in the form of a foot well sized and disposed to accommodate a passenger's feet.

14. An improved performed interior floor cover member as in claim 13 wherein:
a) said sealing cover is provided with stretchable folded portions disposed adjacent side wall regions of said foot well; and
b) said fold portions regions provide additional elongation to better resist tearing, cracking or rupture of said cover member in the area adjacent said foot well.

15. An improved performed interior floor cover member as in claim 14 wherein said safety cover member includes:
a) a second layer of woven material disposed to overlay said first sealing layer; and
b) said first sealing layer and said second layer of woven material together forming the interior floor carpet provided to said motor vehicle.

16. An improved pre-formed interior floor cover member as in claim 9 wherein said safety cover member includes:
a) a second layer of carpet-like material disposed to overlay said first sealing layer; and
b) said second layer is bonded to said first layer.

17. An improved pre-formed interior floor cover member as in claim 16 wherein:
a) said first layer includes a foam material.

18. An improved pre-formed interior floor cover member as in claim 16 wherein:
a) said first layer includes a latex material coated on the back of said second layer.

19. Method of sealing the interior passenger space of a vehicle against introduction of noxious vapors and fluids upon collision-induced rupture or fracture of floor members, comprising the steps of:
a) providing a first sealing material layer conforming to at least one floor region of said vehicle interior;
b) providing a second carpet-like layer to overly said first layer; and
c) said first layer is substantially impermeable to gas and liquid and resistant to cracking, ripping or tearing so that a collision-induced rupture or fracture in bottom layers of an interior floor assembly is sealed off from the interior passenger space of said motor vehicle.

20. Method as in claim 19 wherein said first sealing material layer is sprayed or coated on said floor region and said second carpet-like layer is provided thereover.

* * * * *